(12) United States Patent
Elter et al.

(10) Patent No.: US 8,873,105 B2
(45) Date of Patent: Oct. 28, 2014

(54) COLOR MONITORING METHOD FOR PRINTING PRESSES

(71) Applicant: Heidelberger Druckmaschinen AG, Heidelberg (DE)

(72) Inventors: Peter Elter, Muehlhausen (DE); Alexander Knabe, Heidelberg (DE); Nikolaus Pfeiffer, Heidelberg (DE); Wolfgang Schoenberger, Schriesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 39 days.

(21) Appl. No.: 13/675,105

(22) Filed: Nov. 13, 2012

(65) Prior Publication Data

US 2013/0120775 A1 May 16, 2013

(30) Foreign Application Priority Data

Nov. 11, 2011 (DE) .......................... 10 2011 118 335

(51) Int. Cl.
*H04N 1/405* (2006.01)
*B41F 33/02* (2006.01)
*B41F 33/00* (2006.01)
*H04N 1/60* (2006.01)

(52) U.S. Cl.
CPC *H04N 1/60* (2013.01); *B41F 33/02* (2013.01); *B41F 33/0036* (2013.01); *B41F 33/0009* (2013.01)
USPC .............................. 358/2.1; 358/504; 358/406

(58) Field of Classification Search
USPC ..................... 358/1.9, 2.1, 504, 406, 527, 518
See application file for complete search history.

(56) References Cited

U.S. PATENT DOCUMENTS

| 5,537,516 | A | * | 7/1996 | Sherman et al. ................ 358/1.9 |
| 6,804,027 | B2 | * | 10/2004 | Lee et al. ......................... 358/1.9 |
| 7,421,948 | B2 | | 9/2008 | Schneider et al. |
| 7,515,267 | B2 | | 4/2009 | Ehbets et al. |
| 7,523,706 | B2 | | 4/2009 | Schneider et al. |
| 7,884,926 | B2 | | 2/2011 | Engler et al. |

(Continued)

FOREIGN PATENT DOCUMENTS

| DE | 10 2004 044 215 B4 | 3/2008 |
| EP | 1 983 738 A1 | 10/2008 |
| EP | 2 353 865 A1 | 8/2011 |

OTHER PUBLICATIONS

German Patent and Trademark Office Search Report Dated Aug. 9, 2012.

*Primary Examiner* — Thomas D Lee
*Assistant Examiner* — Stephen M Brinich
(74) *Attorney, Agent, or Firm* — Laurence A. Greenberg; Werner H. Stemer; Ralph E. Locher

(57) ABSTRACT

A method of signaling or indicating a coloration condition upon a change of an operating condition in a printing press having a control unit, includes the steps of specifying a target ink density for a print job, storing the specified target ink density in the control unit, calculating an actual ink density using the control unit based on an actual operating condition of the printing press, comparing the actual ink density to the target ink density in the control unit, and emitting a first signal using the control unit when the actual ink density is within a range of tolerance about the target ink density stored in the control unit.

13 Claims, 3 Drawing Sheets

(56) References Cited

U.S. PATENT DOCUMENTS

| | | |
|---|---|---|
| 7,894,065 B2 | 2/2011 | Kohlbrenner et al. |
| 7,978,382 B2 * | 7/2011 | Ono .................... 358/504 |
| 8,272,324 B2 | 9/2012 | Mueller et al. |
| 8,542,418 B2 * | 9/2013 | Chandu et al. .......... 358/504 |

* cited by examiner

27
COLOR MONITORING METHOD FOR PRINTING PRESSES

CROSS-REFERENCE TO RELATED APPLICATION

This application claims the priority, under 35 U.S.C. §119, of German Patent Application DE 10 2011 118 335.7, filed Nov. 11, 2011; the prior application is herewith incorporated by reference in its entirety.

BACKGROUND OF THE INVENTION

Field of the Invention

The present invention relates to a method of signaling or indicating a color condition upon a change of an operating condition or mode of operation in printing presses having a control unit.

In lithographic offset printing presses, changes in machine parameters, such as printing speed, temperature and humidity, have an influence on the application of ink to the printing substrate and thus on print quality. Since the printed products that are being produced are to correspond to the original as closely as possible, such deviations need to be counteracted. In order to find out at what time the printed products are close enough to the original to be sold, a press operator who operates a sheet-fed printing press needs to take sample sheets and examine them using a color measuring device. In most cases, the measurements taken by the color measuring device are compared to the digital data of the original to detect deviations, which are then compensated by modifying ink control. A disadvantage of that process is that unsalable waste may be produced until the printed products have been examined using the color measuring device.

Printing presses that have short inking units, in particular anilox printing units, suffer from another disadvantage: their inking units do not have ink zones and ink keys for individually controlling the metering of the ink in each ink zone. Consequently, virtually the only way to control the ink in an anilox inking unit is by modifying the printing speed and the temperature of the inking unit. A printing speed change can be achieved quickly, but temperature changes take time because a temperature control system is always sluggish. However, in most cases, the printing speed is not a suitable actuating variable because the operator will want to operate the printing press at the highest possible printing speed to be able to print the maximum amount of printed products within the minimum amount of time.

A method for adjusting the transfer of printing ink in a short inking unit is disclosed in German Patent DE 10 2004 044 215 B4, corresponding to U.S. Pat. Nos. 7,421,948; 7,523,706; and 8,272,324. That method proposes adjusting the temperature of the ink by using the circumferential surface of the screen roller in the inking unit. The temperature is used to influence the viscosity and tackiness of the ink. The temperature is adjusted as a function of the printing speed so that by using the temperature control device, the colors can be adjusted correctly in a manner adapted to the different printing speeds. A disadvantage is that the adjusting process is very time-consuming because temperature control is a sluggish system.

The use of color measuring devices to control print quality is known from U.S. Pat. Nos. 7,884,926; 7,894,065; and U.S. Pat. No. 7,515,267 B2.

SUMMARY OF THE INVENTION

It is accordingly an object of the invention to provide a color monitoring method for printing presses, which overcomes the hereinafore-mentioned disadvantages of the heretofore-known methods of this general type and which indicates to an operator that printed products attain a specified, predetermined minimum quality standard and may be sold.

With the foregoing and other objects in view there is provided, in accordance with the invention, a method of signaling a color condition upon a change of an operating condition in a printing press. The method comprises providing a control unit for the printing press, specifying a target ink density for a print job, storing the specified target ink density in the control unit, calculating an actual ink density using the control unit based on an actual operating condition of the printing press, comparing the actual ink density to the target ink density in the control unit, and emitting a first signal using the control unit when the actual ink density is within a range of tolerance about the target ink density stored in the control unit.

The present invention is particularly suited for use in lithographic offset printing presses that have short inking units, although it may be used in all lithographic offset presses that are equipped with a control unit.

In accordance with the method of the invention, the control unit receives and stores a desired or target ink density for each new print job. Based on the actual operating condition of the printing press and on influencing variables such as the printing speed, temperature, humidity, type of ink and type of printing material, the control unit is capable of calculating or at least estimating a current actual ink density and thus an actual coloration on the printing substrate. The calculated actual ink density is then compared to the stored target ink density in the control unit. When the calculated actual ink density is within a range of tolerance about the target ink density stored in the computer, the control unit outputs a first signal. The range of tolerance may encompass color deviations that are just still tolerable, which means that when the first signal is given, the printed products are still saleable. In this case, the operator does not have to examine the printed products using a color measuring device to find out whether or not the printed products are of sufficient quality to be sold. Instead, the first signal is sufficient for the operator to determine when and if the printed products may be sold. The first signal may, in particular, be continuously updated in order for the operator to be continuously informed about the salability of the printed products.

In accordance with another mode of the invention, the control unit may emit a second signal when the actual ink density is outside a range of tolerance about the target ink density. The second signal indicates that the printed products cannot be sold and need to be disposed of as waste. The operator receives continuous information, together with the first signal, as to whether or not the printed products can be sold.

In accordance with an added mode of the invention, the control unit may emit a third signal when the actual ink density corresponds to the target ink density. In this case, the colors of the original and the colors of the printed product will be a perfect match, resulting in maximum possible print quality. For top quality print jobs, a customer may request such a perfect match of colors. In such a case, the third signal may indicate to the operator that this quality requirement is met.

In accordance with an advantageous further mode of the invention, the signals are transmitted to a display device and each emitted signal is assigned a different representation on the display device, in particular a different display color. In this case, the three signals are displayed on the screen of the control unit of the printing press, for instance in different colors. For example, green may indicate optimum print quality, orange just saleable print quality and red may indicate waste. The display may be continuously updated to enable the operator to see which quality the printing press produces at any given time.

In accordance with an additional advantageous mode of the invention, different ranges of tolerance may be selectable on the display device and may be input using a user interface such as a keyboard to give an operator the opportunity to define the quality thresholds for still saleable products himself or herself as a function of the specific print job and the quality the customer requires. A print shop that exclusively prints high-end packaging that needs to meet strict quality requirements will specify smaller ranges of tolerance than a print shop that exclusively prints promotional flyers that may still be sold even if they exhibit certain color deviations. The ranges of tolerance may be provided in the form of percentages and may be input or selected through the use of the keyboard of the control unit or through the use of a touch screen. Ranges of tolerance above and below the optimum target color value may be input, for example −3% for a range of tolerance below the optimum target color value and +5% for a range of tolerance above the optimum target color value. In this way, each operator and each print shop may individually define specific ranges of saleable products of acceptable print quality for each printing press as a function of the specific print job and personal specifications. It is likewise possible to select different ranges of tolerance that may be re-accessed for each new print job. The ranges of tolerance may be displayed on the display device in a different displaying color about the target value.

In accordance with yet another mode of the invention, the control unit may be connected to a color measuring device and characteristic curves for controlling the printing press may be recorded and stored by the color measuring device and the control unit. These characteristic curves are recorded as a function of different parameters such as the temperature, printing speed, printing substrate and printing ink so that the characteristics of the printing press, printing substrates and printing ink are recorded once, for example at the press manufacturer's, and are then stored in a memory. Based on the parameters that have been input or detected by a sensor, to operate the press, the control unit selects or, if necessary, newly calculates suitable characteristic curves, for example by calculating an interpolation of known characteristic curves for slightly deviating parameters. These calculated characteristic curves may be stored in the control unit for future re-use.

In accordance with a concomitant particularly preferred mode of the invention, the display device may be a touch screen and the first signal may be associated with the color yellow, the second signal with the color red, and the third signal with the color green. This representation substantially corresponds to a traffic light that includes the colors red, yellow/orange and green. In this case, green signifies optimum print quality and optimum matching of the original, whereas yellow/orange signifies that there are slight deviations from the optimum print quality but still within the ranges of tolerance, and red signifies that the print quality is too low for the printed products to be sold and that the products need to be disposed of as waste. This is an easy-to-comprehend optical way of continuously informing the printing press operator about the print quality currently produced by his or her printing press.

Other features which are considered as characteristic for the invention are set forth in the appended claims.

Although the invention is illustrated and described herein as embodied in a color monitoring method for printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
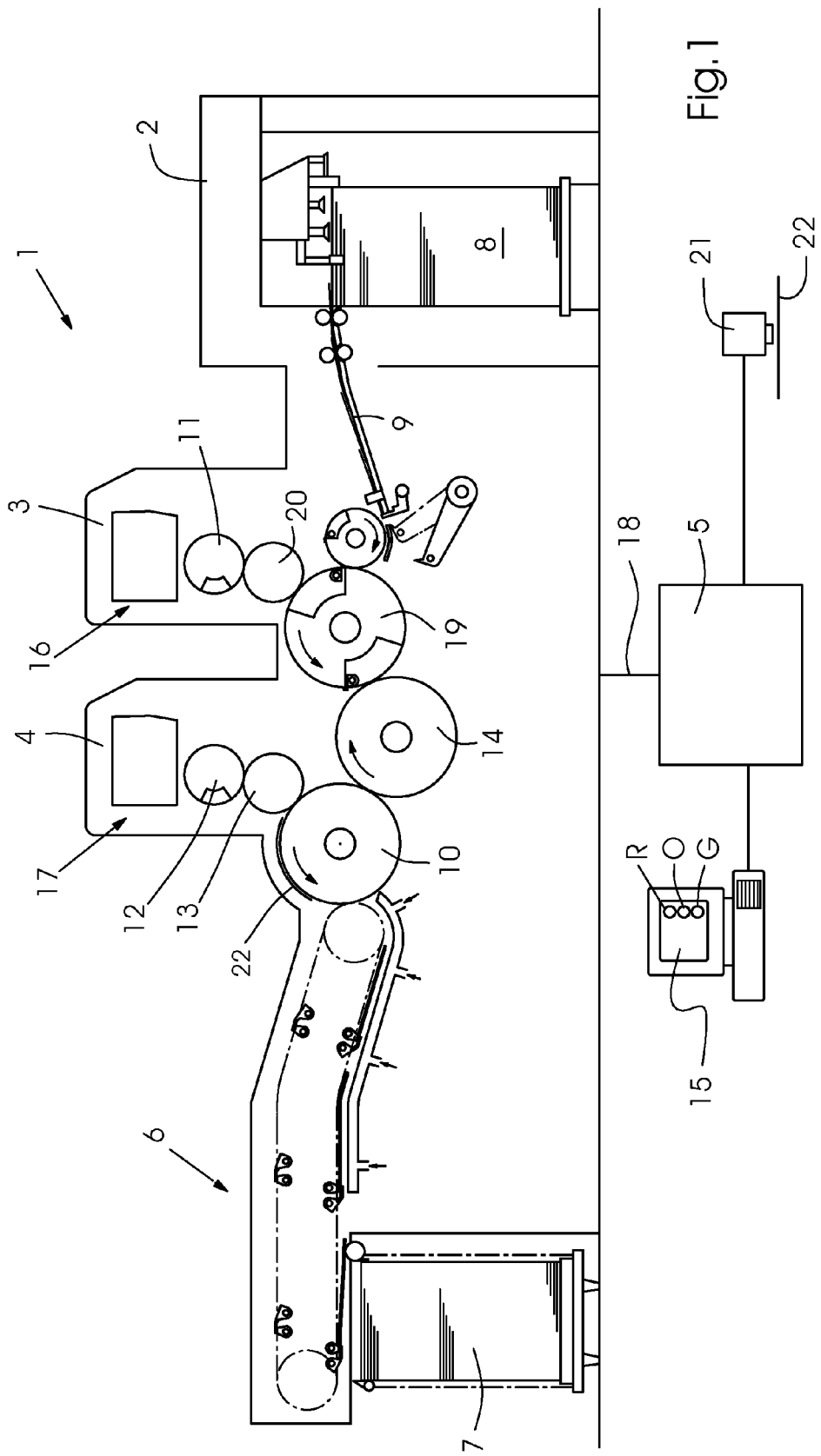
FIG. 1 is a diagrammatic, longitudinal-sectional view of a sheet-fed printing press including a short inking unit and a display for displaying current print quality.

Referring now to the figures of the drawings in detail and first, particularly, to FIG. 1 thereof, there is seen a sheet-fed printing press 1 including two printing units 3, 4. The two printing units 3, 4 are of similar construction, each including a plate cylinder 11, 12 carrying a printing plate, a blanket cylinder 13, 20 and an impression cylinder 10, 19. Ink is supplied to the printing units 3, 4 by so-called short inking units 16, 17. Sheet-shaped printing substrates 22 are removed from a feeder stack 8 in a feeder 2 and are transferred to the first printing unit 3 by a feed table 9. A first color separation is printed onto the substrates 22 between the blanket cylinder 20 and the impression cylinder 19 in the first printing unit 3. The printed substrates 22 are then transferred by a transport cylinder 14 to the second printing unit 4 to receive the second color separation. A delivery 6 for depositing the printed substrates 22 on a delivery stack 7 is provided at the exit of the second printing unit 4.

Since the printing press 1 is equipped with so-called short inking units 3, 4, the only possibility of controlling the coloration of the printed products is to modify the printing speed V or the temperature T in the inking unit 4, 3. This is done by using a control unit 5 that controls all components of the printing press 1 through a communication link 18 with a data bus. The control unit 5 further includes a monitor or screen 15, embodied as a touch screen, for indicating the current operating condition of the printing press 1. An operator of the printing press 1 can use the screen 15 to make inputs and to control the printing press 1. The screen 15 continuously displays the current quality of the printed products produced in the printing press 1 in the form of a traffic light including the colors red R, orange O and green G. Red means that the printed products 22 currently produced by the printing press 1 cannot be sold and need to be disposed of as waste. Orange means that although the printed products 22 do deviate from optimum color conditions, the deviations are within the ranges of tolerance defined by the operator and may be sold. Green signals or indicates that the optimum coloration is achieved and there is hardly any deviation between the printed product 22 and the original.

In addition, a color measuring device 21 may be connected to the control unit 5 to measure the printed products 22. Thus, it is possible to additionally check the quality of the print on the substrates 22 by color measurements. The color measuring device 22 may also be used to record characteristic curves for controlling the printing press 1 as a function of parameters such as the type of paper and printing ink, the printing speed V and the temperature T and to store them in the control unit 5. This recording of characteristic curves may be made by the manufacturer before the printing press 1 is delivered.

Figure 2:
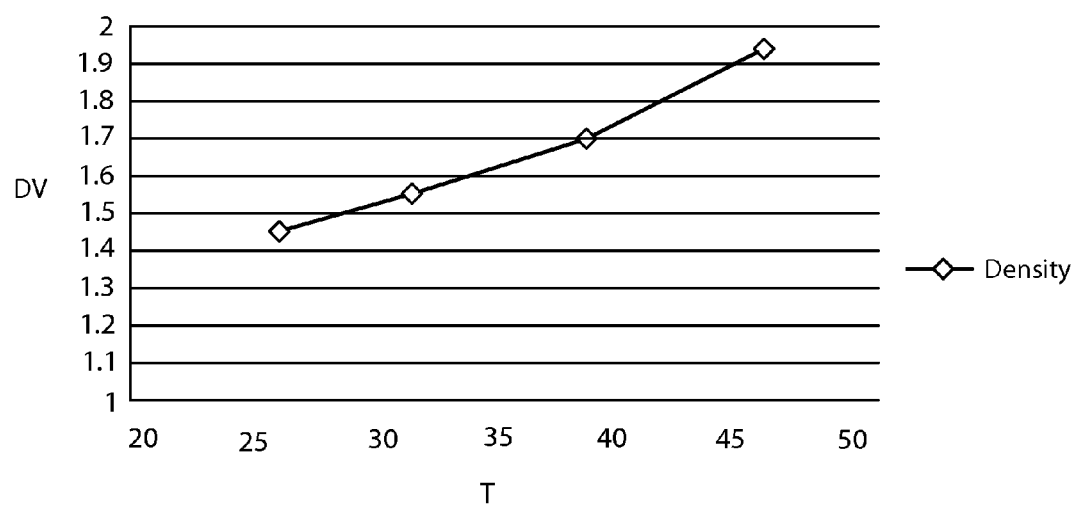
FIG. 2 is a diagram illustrating a general relation between ink density and temperature.

By way of example, FIG. 2 illustrates the relationship between ink density DV and temperature T. The relationship is not completely linear and needs to be taken into account when the ink density is adjusted. The ink density depends on the coloration of the original. The values of a digital original may be converted into corresponding ink density values DV by the control unit 5. The control unit 5 will then calculate a suitable temperature T at which the specified ink density values DV are attained, as a function of the printing speed V and further parameters such as the printing substrate and printing ink. The specified ink density values are referred to as target ink density values $DV_{Soll}$. The current ink density values are referred to as actual ink density values $DV_{Ist}$. When the display device 15 displays the green signal G, the actual ink density values $DV_{Ist}$ correspond to the target ink density values $DV_{Soll}$.

Figure 3A:
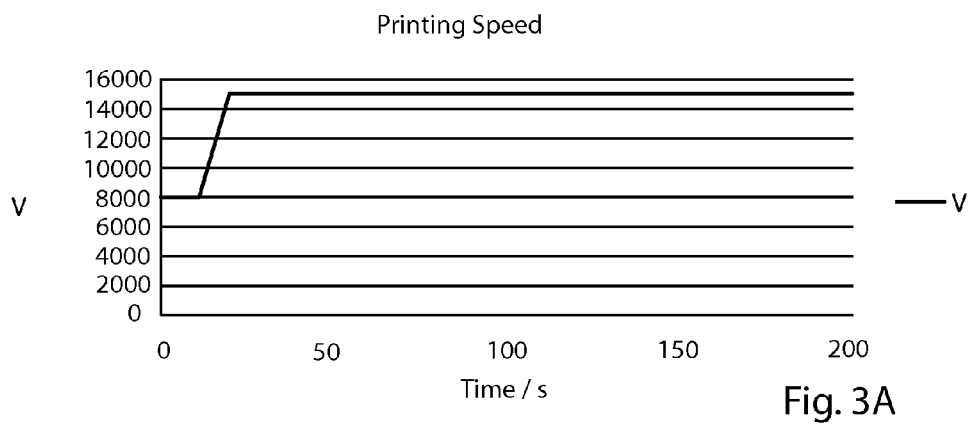
FIG. 3A is a diagram illustrating a printing speed change from 8,000 to 15,000 prints.

FIG. 3A plots a change of the printing speed in sheets/hour over time in seconds. At a point in time S=20 sec., the printing speed increases from 8,000 sheets/hour to 15,000 sheets/hour within a short period of time. This increase of the printing speed V results in a change of the coloration on the printed products 22 because the coloration depends on the printing speed V.

Figure 3B:
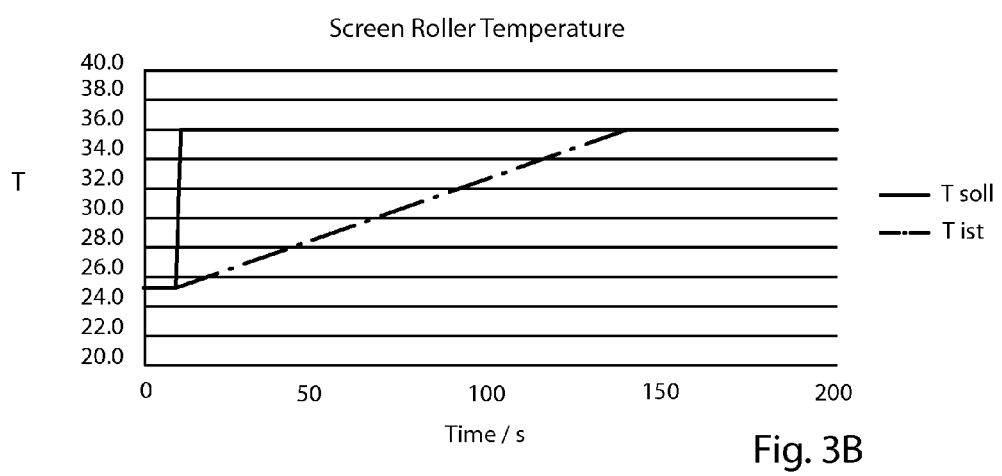
FIG. 3B is a diagram illustrating a target temperature change necessitated by the speed change and the progression of the actual temperature.

FIG. 3B illustrates the progression of the target, set point or desired temperature $T_{Soll}$ and the progression of the actual temperature $T_{Ist}$. In order to attain the desired coloration $DV_{Soll}$, the target temperature $T_{Soll}$ needs to be attained. However, the diagram shows that the actual temperature $T_{Ist}$ strongly deviates from the target temperature $T_{Soll}$ in particular during and shortly after the speed change. This is due to the fact that a temperature change is a sluggish process. It is impossible for the temperature T in the short inking units 16, 17 to change quickly in one big leap. As a consequence, for a certain amount of time, there is a considerable difference between the target temperature $T_{Soll}$ required to attain the specified coloration and the actual temperature $T_{Ist}$, which means that the target ink density $DV_{Soll}$ cannot be attained. For a certain amount of time, waste will be produced.

Figure 3C:
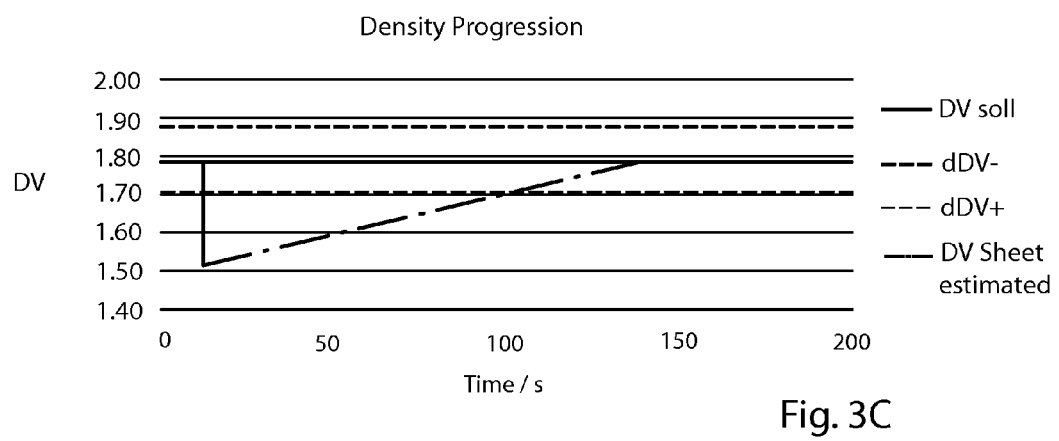
FIG. 3C is a diagram illustrating a progression of the target ink density, the actual ink density and the ranges of tolerance.

FIG. 3C illustrates the corresponding progression of the ink density DV. The diagram indicates the target ink density $DV_{Soll}$ and the current ink density $DV_{Ist}$ as calculated by the control unit 5 based on the current temperature $T_{Ist}$. The actual ink density $DV_{Ist}$ corresponds to the estimated actual ink density present on the printed substrate 22. In addition, FIG. 3C indicates ranges of tolerance about the target ink density $DV_{Soll}$. An upper threshold is indicated at dDV+ and a lower threshold is indicated at dDV−. As long as the target, set point or desired ink density $DV_{Soll}$ is outside the two ranges of tolerance dDV− and dDV+, waste is being produced, and the red light will be displayed on the display device or screen 15. When the lower threshold dDV− is attained, the light on the display device 15 will switch to orange to indicate to the operator that the printed substrates 22 that are produced from then on may be sold. When the actual ink density $DV_{Soll}$ has reached the target ink density $DV_{Soll}$ at a point in time S=140 sec, the light on the display 15 will switch to green, signaling to the operator that the optimum print quality has been attained.

The control unit 5 thus calculates a corresponding temperature $T_{Soll}$ required to attain the desired ink density $DV_{Soll}$ as a function of the desired printing speed V. At the same time, based on the established or estimated actual temperature and printing speed values, the control unit 5 calculates the actual ink density $DV_{Ist}$ and establishes any deviation from the predetermined target ink density $DV_{Soll}$. Based on the magnitude of the deviation, the traffic light on the display 15 indicates the current print quality. In this way, the operator will at all times be informed about the quality that is being produced and may decide whether or not the printed products that are currently being produced meet his or her requirements. A respective temperature sensor, which may, for example, transmit the temperature of the screen rollers to the control unit 5, may be provided in the inking units 16, 17 to detect the actual temperature $T_{Ist}$. In addition to changing the printing speed, further parameters such as the duration of an interruption of the printing operation or a temperature increase initiated by the operator or modifications caused by a print job change may be taken into account in that these data are input by the operator into the control unit 5 or detected by sensors during operation of the printing press 1. The ranges of tolerance dDV− and dDV+ shown in FIG. 3C are not rigid. Instead, by using the screen 15, a printing press operator may input or select different ranges of tolerance as required to meet the quality requirements for the current print job.

The invention claimed is:

1. A method of signaling a color condition upon a change of an operating condition in a printing press, the method comprising the following steps:
   providing a control unit for the printing press;
   specifying a target ink density for a print job;
   storing the specified target ink density in the control unit;
   calculating an actual ink density using the control unit based on an actual operating condition of the printing press;
   comparing the actual ink density to the target ink density in the control unit; and
   emitting a first signal using the control unit when the actual ink density is within a range of tolerance about the target ink density stored in the control unit.

2. The method according to claim 1, which further comprises emitting a second signal using the control unit when the actual ink density is outside a range of tolerance about the target ink density.

3. The method according to claim 2, which further comprises emitting a third signal using the control unit when the actual ink density corresponds to the target ink density.

4. The method according to claim 3, which further comprises:
   transmitting the signals to a display device; and
   assigning a different representation to each signal on the display device.

5. The method according to claim 4, wherein the different representation is a different display color.

6. The method according to claim 1, which further comprises supplying a temperature in an inking unit and a printing speed to the control unit as operating conditions.

7. The method according to claim 1, which further comprises supplying process-specific actual conditions to the control unit.

8. The method according to claim 7, wherein the process-specific actual conditions are characteristics of the printing ink or of a printing substrate.

9. The method according to claim 1, which further comprises selecting different ranges of tolerance using a display device and inputting the ranges of tolerance using a user interface.

10. The method according to claim 9, wherein the user interface is a keyboard.

11. The method according to claim 9, which further comprises assigning a different display color on the display device to each range of tolerance.

12. The method according to claim 1, which further comprises:
   connecting a color measuring device to the control unit; and
   recording and storing characteristic curves for controlling the printing press using the color measuring device and the control unit.

13. The method according to claim 4, wherein the display device is a touch screen, the first signal is assigned the color yellow, the second signal is assigned the color red and the third signal is assigned the color green.

* * * * *